United States Patent [19]
Vanka et al.

[11] Patent Number: 5,561,783
[45] Date of Patent: Oct. 1, 1996

[54] DYNAMIC CACHE COHERENCY METHOD AND APPARATUS USING BOTH WRITE-BACK AND WRITE-THROUGH OPERATIONS

[75] Inventors: Subbarao Vanka, Portland, Oreg.; Prasanna Rupasinghe, Sacramento, Calif.; Mark Lalich, Orangevale, Calif.; Abid Ahmad, Folsom, Calif.

[73] Assignee: Intel Corporation, Santa Clara, Calif.

[21] Appl. No.: 409,884

[22] Filed: Mar. 22, 1995

Related U.S. Application Data

[63] Continuation of Ser. No. 977,232, Nov. 16, 1992, abandoned.

[51] Int. Cl.$^6$ .............................. G06F 13/00; G06F 12/00
[52] U.S. Cl. .................... 395/468; 395/469; 395/470; 395/877; 364/DIG. 1; 364/DIG. 2
[58] Field of Search .................... 395/445, 468, 395/469, 470, 481, 872, 877

[56] References Cited

U.S. PATENT DOCUMENTS

| | | | |
|---|---|---|---|
| 5,091,846 | 2/1992 | Sachs et al. | 395/469 |
| 5,140,681 | 8/1992 | Uchiyama et al. | 395/461 |
| 5,301,298 | 4/1994 | Kagan et al. | 395/468 |
| 5,325,504 | 6/1994 | Tipley et al. | 395/455 |
| 5,467,295 | 11/1995 | Young et al. | 395/200.05 |
| 5,469,555 | 11/1995 | Ghosh et al. | 395/469 |
| 5,479,636 | 12/1995 | Vanka et al. | 395/470 |

*Primary Examiner*—Glenn Gossage
*Attorney, Agent, or Firm*—Blakely, Sokoloff, Taylor & Zafman

[57] ABSTRACT

A dynamic cache coherency method and apparatus providing enhanced microprocessor system performance are described. The method and apparatus are advantageously utilized in a microprocessor system comprising a central processing unit (CPU), a write back cache memory, dynamic random access memory (DRAM) main memory, a cache and DRAM controller (CDC), and a data path unit (DPU) with a write buffer. In accordance with the method of operation, following a write access by the CPU, the CDC determines whether the write buffer is full and whether the cache line associated with this access has been modified, i.e. is "clean" or "dirty." In the event that the write buffer is full, or the cache line is dirty, the write operation proceeds in accordance with a write back mode of operation. However, if the write buffer in the DPU is not full, and the cache line is clean, the CDC writes the write data to both the cache line in cache memory, and the write buffer in the DPU. These two write operations proceed concurrently, and are completed in the same amount of time. When they are completed, the processor cycle is also complete, and the CPU proceeds with its next task. Thereafter, in the background, the posted data in the write buffer is flushed to DRAM, without incurring any CPU overhead.

13 Claims, 6 Drawing Sheets

DYNAMIC CACHE COHERENCY METHOD AND APPARATUS USING BOTH WRITE-BACK AND WRITE-THROUGH OPERATIONS

This is a continuation of application Ser. No. 07/977,232, filed Nov. 16, 1992, now abandoned.

BACKGROUND OF THE INVENTION

1. Field of the Invention

The present invention relates to microprocessor systems, and more particularly, to a dynamic cache coherency method and apparatus providing enhanced microprocessor system performance.

2. Related Applications

This application is related to copending U.S. patent application Ser. No. 07/977,226, filed Nov. 16, 1992, now abandoned in favor of continuation application Ser. No. 08/400,116, filed Mar. 6, 1995, now U.S. Pat. No. 5,479,636, entitled "Concurrent Cache line Replacement Method and Apparatus In Microprocessor System With Write Back Cache Memory," copending U.S. patent application Ser. No. 07/976,891, filed Nov. 16, 1992, (now abandoned in favor of continuation application Ser. No. 08/508,096 filed Jul. 27, 1995), entitled, "Zero Wait State Cache Using Non-Interleaved Banks Of Asynchronous SRAM, " and copending U.S. patent application Ser. No. 07/977,228, filed Nov. 16, 1992, (now abandoned in favor of continuation application Ser. No. 08/410,010 filed Mar. 23, 1995), entitled, "Pseudo-Concurrent Access to a Shared Resource."

3. Art Background

In order to avoid frequent, cycle consuming accesses of main memory, a microprocessor system frequently utilizes cache memory. A cache memory is typically comprised of a relatively small amount of static random access memory (SRAM) which is both physically faster than main memory and arranged such that it can be addressed more rapidly than main memory. The cache memory is then disposed between the microprocessor and the main memory and used to capture and store instructions and data as they are used by the microprocessor. Once these instructions and data are present in the cache memory, the microprocessor can, thereafter, quickly and advantageously access them in the cache memory rather than in main memory. The intelligent design and management of a cache memory can substantially enhance the performance of the overall microprocessor system.

One of the problems associated with the use of a cache memory in a microprocessor system, however, is the problem of cache coherency. In particular, when a block of data is first placed in the cache memory from main memory the block of data constitutes an exact copy of the block of data as stored in main memory. If the microprocessor, however, later modifies this block of data in cache memory, for example, through a write operation, and fails to similarly modify the corresponding block of data in main memory, the two blocks of data become inconsistent or incoherent. Under such circumstances, the main memory will continue to store what is now a "stale" block of data, while the cache memory stores the proper "updated" block of data. If an input/output (I/O) unit or an additional, associated microprocessor thereafter accesses the block of data in main memory, it improperly accesses a stale block of data. For this reason, as well as others, cache coherency or consistency must be maintained in a microprocessor system.

Two basic solutions to the problem of cache coherency have been devised. The first solution utilizes what is termed "a write through cache." In a write through cache, coherency is maintained by ensuring that whenever a write operation to a block of data in cache memory occurs, a similar write operation is also performed on the corresponding block of data residing in main memory. While this approach effectively guarantees coherency, it also exacts a heavy performance price, as the length of each and every write operation is determined not by the relatively fast time it takes to write to cache memory, but instead, by the relatively slow amount of time it takes to write to main memory.

A second solution which offers higher performance by not exacting as much processor overhead utilizes what is termed "a write back cache." In a write back cache, a write operation to a block of data in cache memory is not immediately accompanied with a similar write operation to the corresponding block of data residing in main memory. Instead, cache coherency is maintained through the use of subsequent and selective write back operations from the cache memory to the main memory. Such write back operations can be made selectively whenever they are required to maintain cache coherency.

One common context in which a write back cache necessarily utilizes a write back occurs in a write back cache when a processor read access results in a cache miss to a modified or "dirty" cache line. In order to avoid an overwriting of the dirty cache line before updating main memory, a write back of the dirty cache line to main memory must occur before the new cache line is placed in the cache. In such a scenario, in prior art systems, two separate operations were performed in serial fashion. First, the older, dirty cache line was written to main memory, then in serial fashion, the new cache line was written from main memory to the former cache line location of the dirty cache line. Such prior art replacement approaches, however, adversely required the processor to wait or stall for the whole duration of the serial replacement operation, resulting in the waste of valuable processor time. A novel method and apparatus which advantageously performs these two operations concurrently is described in U.S. Pat. No. 5,479,636, entitled, "Concurrent Cache Line Replacement Method and Apparatus In Microprocessor System With Write Back Cache Memory." As described in this copending U.S. Patent Application, such a concurrent cache line replacement method and apparatus advantageously reduces processor overhead and thereby enhances the performance of the overall microprocessor system.

As will be described, in accordance with the present invention, processor overhead is also reduced through the use of a dynamic cache coherency method and apparatus. As will be explained, the dynamic cache coherency method and apparatus of the present invention reduces processor overhead by dynamically utilizing a cache memory in a write back mode under certain predefined conditions, and alternatively, utilizing the same cache memory in a write through mode in the event of certain other predefined conditions.

SUMMARY OF THE INVENTION

The present invention finds application in the area of microprocessor systems, and more particularly, to a dynamic cache coherency method and apparatus providing enhanced microprocessor system performance. The present invention is advantageously utilized in a microprocessor system comprising a central processing unit (CPU), a write back cache memory, dynamic random access memory (DRAM) main memory, a cache and DRAM controller (CDC), and a data path unit (DPU) with a write buffer.

In accordance with the method of operation of the present invention, the CDC alternatively operates in a write back mode or write through mode, depending upon the existence of predesignated conditions. More particularly, following a write access by the CPU, the CDC determines whether the write buffer is full and whether the cache line associated with this access has been modified, i.e. is "clean" or "dirty." In the event that the write buffer is full, the write operation proceeds in accordance with a write back mode utilization of the cache memory. In particular, the CDC completes the write operation to the cache line in cache memory, and the CPU cycle is complete, allowing the CPU to proceed to its next task. At a later point in time, however, the CDC may need to execute a replacement operation in order to ensure cache coherency. If the CDC determines that the DPU write buffer is not full, but also determines that the cache line is dirty, the previously described write back mode of operation is also utilized.

However if the write buffer in the DPU is not full, and the cache line is clean, in accordance with the present invention, the CDC writes the write data from the CPU to both the cache line in cache memory and the write buffer in the DPU. These two write operations proceed concurrently, and are completed in the same amount of time. When they are completed, the processor cycle is also complete, and the CPU proceeds with its next task. Thereafter, in the background, the posted data in the write buffer is flushed to DRAM, without incurring any CPU overhead. For example, the posted data can be flushed from the write buffer to DRAM during the next processor cycle while the CPU is proceeding with its next task. The cache line is not marked as dirty following this write operation. Thus, by writing the data to both the cache memory and the write buffer in the DPU, this write operation effectively consumes the same amount of processor time as would a write to a write back cache, but actually provides for the benefits one would find in a write through cache.

Accordingly, the present invention provides for an advantageous hybrid use of a cache memory, using a dynamic cache coherency method and apparatus which provides for enhanced microprocessor system performance.

BRIEF DESCRIPTION OF THE DRAWINGS

Further details are explained below with the help of the examples illustrated in the attached drawings in which.

DETAILED DESCRIPTION OF THE INVENTION

A dynamic cache coherency method and apparatus providing enhanced microprocessor system performance are described. In the following description, for purposes of explanation, numerous details are set forth in order to provide a thorough understanding of the present invention. However, it will be apparent to one skilled in the art that such specific details are not essential to the practice of the present invention. In other instances, in a number of figures, well known electrical structures and circuits are shown in block diagram form in order not to obscure the present invention unnecessarily.

Figure 1:
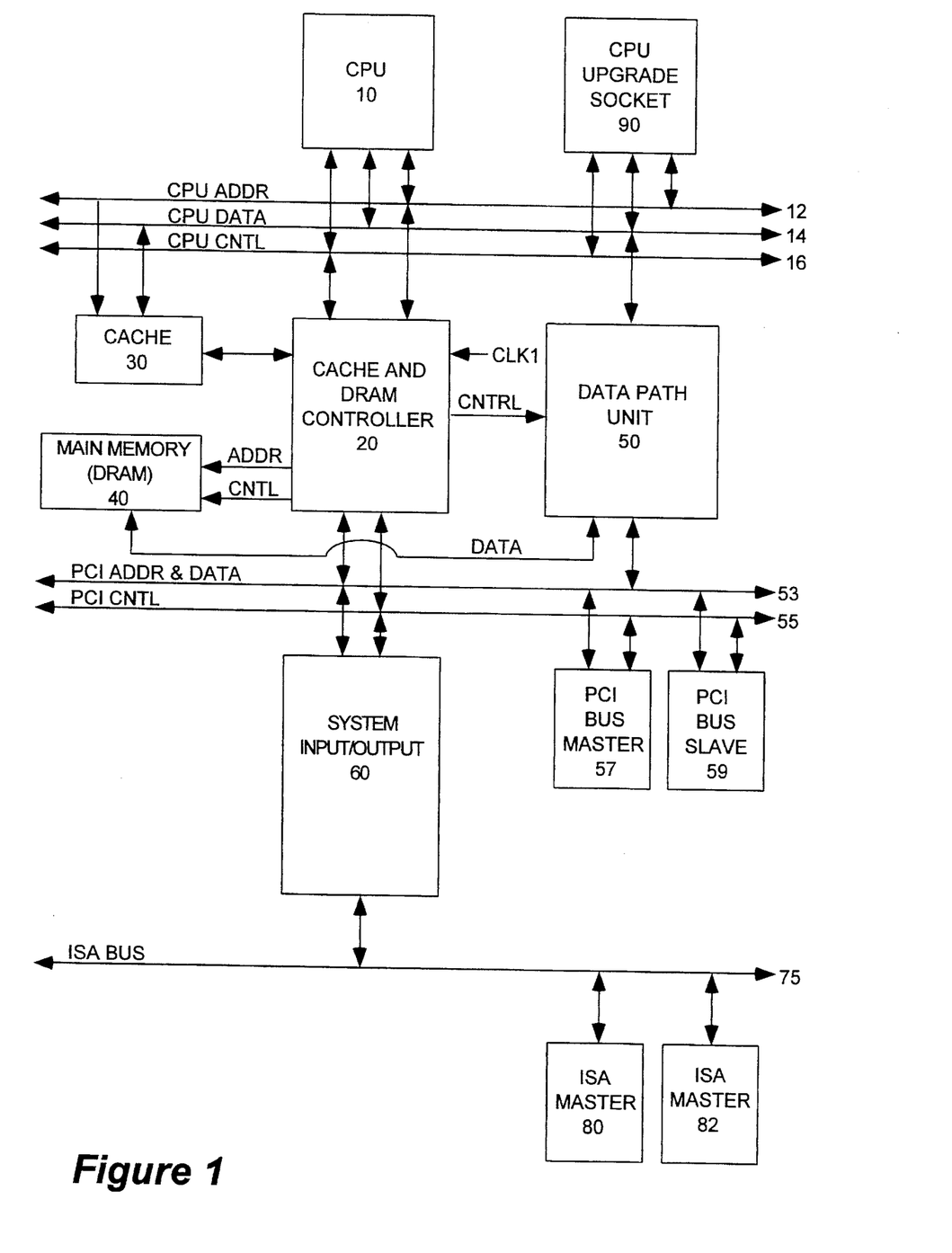
FIG. 1 illustrates a microprocessor system in which the present invention can advantageously be utilized.

Referring now to FIG. 1, this figure illustrates, in block diagram form, a microprocessor system in which the present invention can be advantageously utilized. The microprocessor system includes a microprocessor (CPU) 10, a CPU address bus 12, a CPU data bus 14, a CPU control bus 16, a cache memory 30, main memory (DRAM) 40, a cache and DRAM controller (CDC) 20, a data path unit (DPU) 50, a peripheral component interconnect (PCI) address and data bus 53, a peripheral component interconnect (PCI) control bus 55, both buses shown with a bus master 57 and a bus slave 59, a system I/O component (SIO) 60, an industry standard architecture (ISA) bus 75 shown with ISA masters 80 and 82, and a CPU upgrade socket 90. As shown in this figure, the CPU 10 is coupled to the CPU address bus 12 such that it can transfer access addresses over this bus, the data bus 14 such that it can transfer data over this bus, and the control bus 16 such that it can transfer control signals over this bus.

The cache memory 30 is advantageously comprised of static random access memory (SRAM) and is an external, second level write back cache for the CPU 10. (The first level cache, not shown, is disposed within the CPU chip 10). The cache memory 30 can, for example, comprise a one or two bank, direct mapped, non-interleaved cache memory implemented using standard asynchronous SRAMs. The microprocessor system can accommodate cache memory sizes ranging from 64 KB to 512 KB, with a line size of 16 Bytes (4 double-works or d-words), and a tag size of 7 or 8 bits. As shown, cache memory 30 is coupled to the CPU data bus 14 such that it can receive data from, and provide data to, the CPU 10. Continuing to refer to FIG. 1, the main memory (DRAM) 40 is comprised of dynamic random access memory (DRAM), which might, for example, range in size from 2 MBytes to 128 MBytes. The DRAM 40 can be implemented as either a discrete device or single in line memory modules (SIMMs).

The PCI address and data bus 53, and PCI control bus 55, are buses which together, provide for a physical interconnection mechanism between integrated peripheral controller components and processor/memory systems. In particular, peripheral I/O components such as disk drive controllers, network controllers and graphics controllers can be coupled to such a peripheral bus. Two such peripheral I/O components, denoted PCI bus master 57 and PCI bus slave 59, are shown in FIG. 1 coupled to the PCI address and data bus 53, and the PCI control bus 55. A specific peripheral component interconnect bus which is advantageously utilized in connection with the present invention is described in a related patent, U.S. Pat. No. 5,467,295, entitled "Bus Arbitration With Master Unit Controlling Bus And Locking A Slave Unit That Can Relinquish Bus For Other Masters While Maintaining Lock On Slave Unit." Such a bus is characterized by a rich mix of I/O capabilities such that several peripheral components can be coupled to the bus and perform their functions relatively autonomously, in a fashion similar to, for example, the CPU 10 performing its functions on its associated CPU buses. A system I/O (SIO) component 60 serves as a bridge from the PCI buses 53 and 55 to an ISA bus 75. The SIO component 60 integrates an ISA compatible direct memory access (DMA) controller, timer/counter and interrupt controller, as well as PCI bus arbitration logic (not shown in this figure).

Continuing to refer to FIG. 1, the data path unit (DPU) 50 is a three port application specific integrated circuit (ASIC) comprised of data buffers and associated control logic. The DPU 50 is coupled through a first port to the CPU data bus 14 such that it can receive data from, and provide data to, the CPU 10. Through a second port, the DPU 50 is coupled to main memory (DRAM) 40 such that it can provide data to, and receive data from, DRAM 40. And through a third port, the DPU 50 is coupled to the PCI address and data bus 53. Disposed within the microprocessor system in this manner, the DPU 50 is advantageously utilized to route data from the CPU data bus 14 to the PCI address and data bus 53, the CPU data bus 14 to DRAM 40, and the PCI address and data bus 53 to DRAM 40. In order to facilitate these and other functions, in a first embodiment, the DPU 50 incorporates two sets of write buffers. A first set of write buffers is 4 d-words deep (16 bytes) and is associated with transfers between the CPU 10 and the DRAM 40, while a second set of write buffers also 4 d-words deep is associated with transfers between the CPU 10 and the PCI buses.

The cache and DRAM controller (CDC) 20 controls accesses to cache memory 30 and DRAM 40. CDC 20 is comprised of buffers, a plurality of control logic blocks, and configuration registers used to specify: PCI bus configurations, DRAM configurations, cache configurations, operating parameters, and optional system features (not shown in this figure). In operation, the CDC 20 effectively interfaces DRAM 40 to the CPU buses as well as the PCI buses. Through the use of cache controller logic, it additionally controls accesses to cache memory 30, and through the use of DPU controller logic, CDC 20 further manages the buffering of data within the DPU 50 in order to alternatively operate the system in a write through or write back mode in accordance with the teaching of the present invention.

Figure 2:
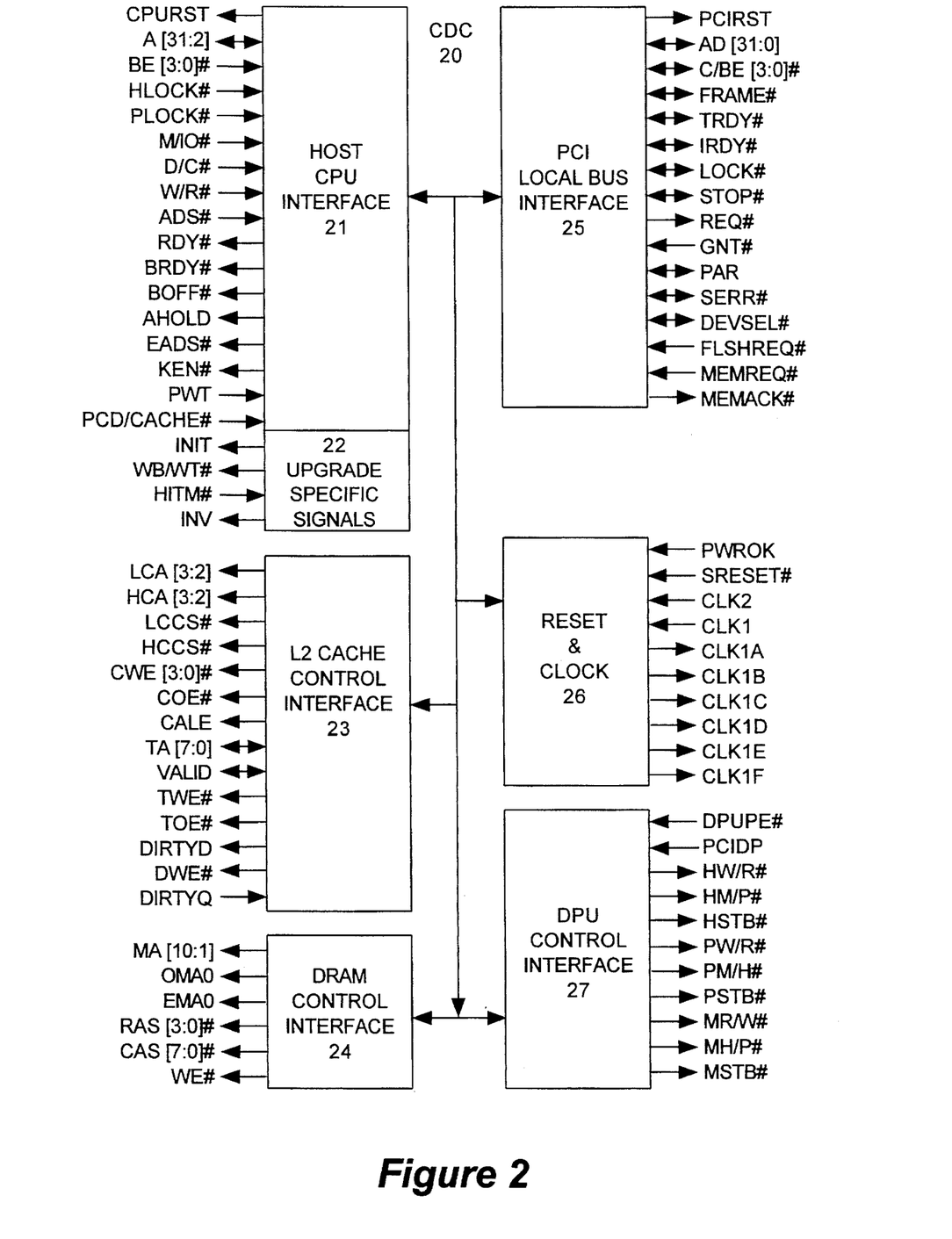
FIG. 2 illustrates, in block diagram form, the logic blocks of the cache and DRAM controller.

With reference now to FIG. 2, this figure illustrates, in block diagram form, the functional logic blocks of the CDC 20, as well as the control signal inputs and outputs associated with each of these functional logic blocks. Reserving a description of the control signal inputs and outputs relevant to the present invention for later, while referring both to FIGS. 1 and 2, the logic blocks in CDC 20 include: a host CPU interface 21 which interfaces CDC 20 with CPU 10 and an upgrade specific signals block 22 which generates particular signals in the event a CPU upgrade is incorporated into the CPU upgrade socket 90 shown in FIG. 1. CDC 20 further incorporates an L2 Cache control interface 23 which interfaces CDC 20 with cache memory 30 thereby serving to manage accesses to cache memory 30. DRAM control interface 24 interfaces CDC 20 with DRAM 40, serving to control accesses to DRAM 40, while DPU control interface 27 interfaces CDC 20 to DPU 50 and manages the buffering of data within DPU 50. The PCI local bus interface 25 interfaces CDC 20 to the PCI buses 53 and 55, while the reset and clock block 26 contains the central clock generation logic for the microprocessor system.

Figure 3:
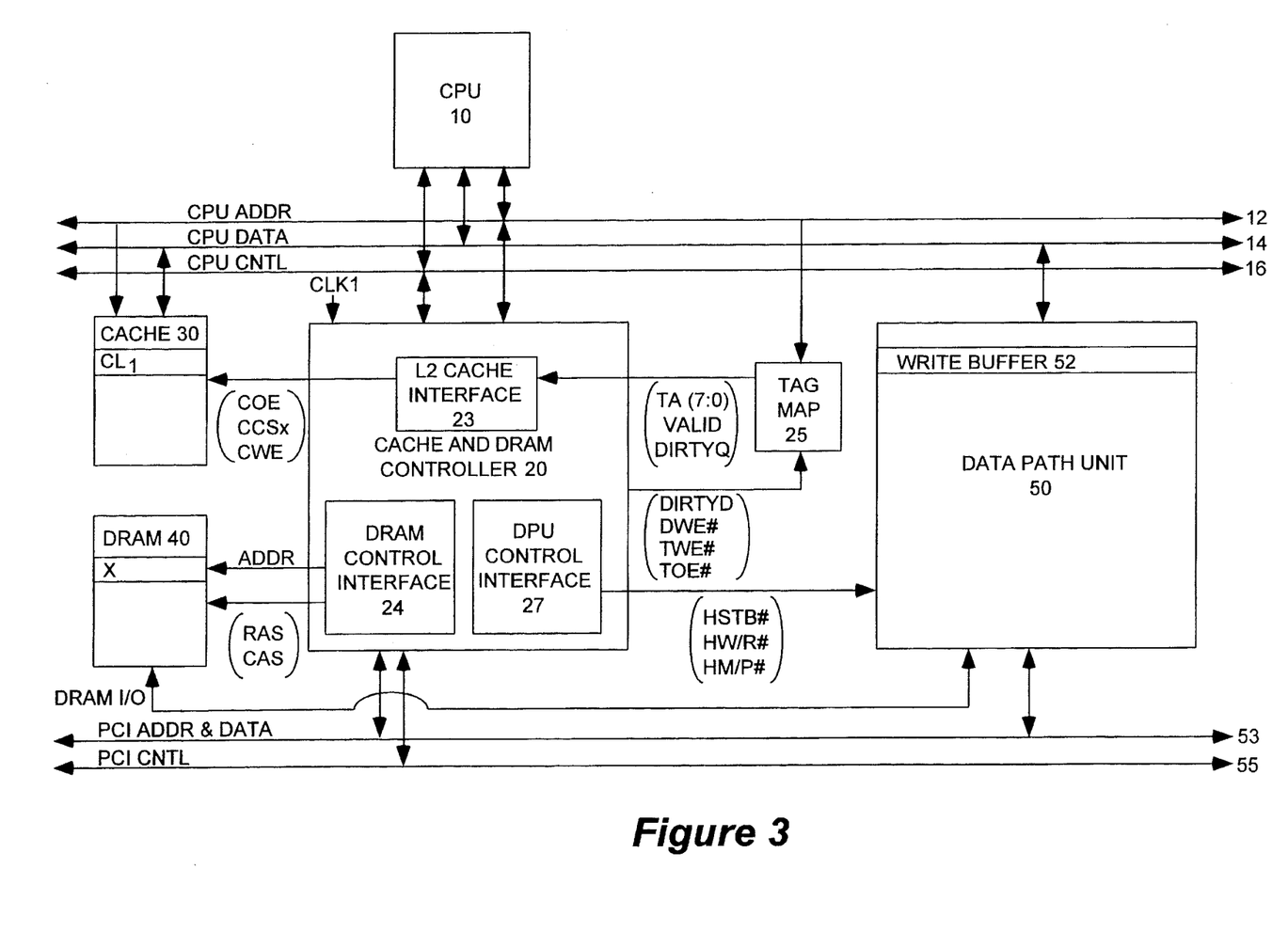
FIG. 3 illustrates the components of the microprocessor system and control signals utilized in the present invention.

Referring now to FIG. 3, this figure illustrates the components shown in the preceding figures which are particularly utilized to accomplish the dynamic cache coherency method and apparatus of the present invention. Additional elements shown in this figure include a tag map circuit 25 which receives addresses from the CPU address bus 12, and responsively translates these addresses such that the CDC 20, and in particular, the L2 cache interface block 23 in CDC 20 can determine whether a cache hit or miss has occurred. Also shown in this figure, in simplified form, is a write buffer 52 within the DPU 50. Write buffer 52 is associated with transfers from the CPU 10 to the DRAM 40. As previously described, this write buffer, can, for example, comprise a first plurality of write buffers, 4 d-words deep (16 bytes) (not shown).

Figure 4:
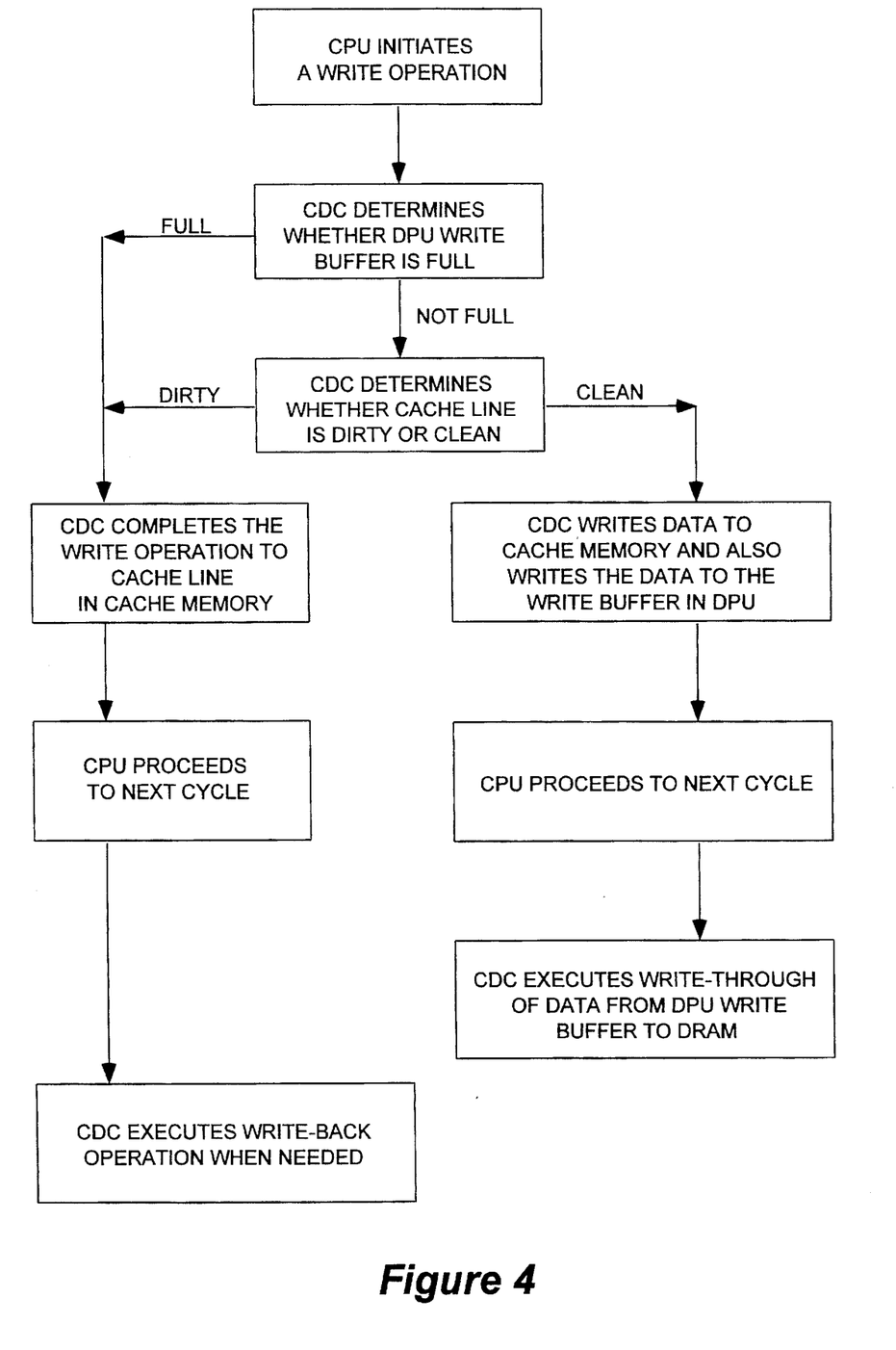
FIG. 4 illustrates, in flow chart form, the dynamic cache coherency method of the present invention.

Referring now to FIG. 4, this figure illustrates, in flow chart form, the method of operation of the present invention. With reference now to both FIGS. 3 and 4, the method of operation of the present invention will be described. Initially, the CPU 10 initiates a write operation to a particular address. This address is coupled over the CPU address bus 12 to both the tag map 25 and the CDC 20. Assume for illustrative purposes that the address maps to cache line $CL_1$. The CDC 20 determines whether the write buffer 52 in DPU 50 is full. In the event that the write buffer is full, the write operation proceeds in accordance with a write back mode utilization of cache memory 30. In particular, the CDC 20 completes the write operation to the cache line $CL_1$ in cache memory 30 and the CPU 10 cycle is complete, allowing the CPU 10 to proceed to its next task. At a later point in time, the CDC 20 will likely need to execute a write back operation to ensure cache coherency such that the contents of cache line $CL_1$ are written back to DRAM 40. Such a write back operation can advantageously be performed using the concurrent cache line replacement method described in U.S. Pat. No. 5,479,636, entitled, "Concurrent Cache Line Replacement Method and Apparatus In Microprocessor System With Write Back Cache Memory."

Continuing to refer to FIGS. 3 and 4, in addition to determining whether the writer buffer 52 in the DPU 50 is full or not, the CDC 20 also determines whether the cache line associated with this address has been modified, i.e. is "dirty" or "clean." If the CDC 20 determines that the DPU write buffer 52 is not full, but also determines that the cache line is dirty, the previously described write back mode of operation of cache-memory 30 is utilized. In particular, the CDC 20 completes the write operation to the cache line $CL_1$ (determined to be dirty), and the CPU cycle is complete, allowing the CPU to proceed to its next task. As before, a later write back operation will likely be required to ensure cache coherency.

However, if the write buffer 52 in DPU 50 is not full, and the cache line $CL_1$ is clean, in accordance with the present invention, the CDC 20 writes the data from the data bus 14 to both the cache line $CL_1$ in cache memory 30, and the write buffer 52 in DPU 50. In accordance with the present invention, these two write operations proceed concurrently and are completed at the same time. When they are completed, the processor cycle is also complete, and the CPU 10 proceeds with its next task. Thereafter, in the background, the posted data in write buffer 52 is flushed to DRAM 40, without incurring any CPU 10 overhead. The posted data can, for example, be flushed from write buffer 52 to DRAM 40 immediately during the next processor cycle while the CPU 10 is proceeding with its next task. Because this write through strategy has been utilized, the cache line $CL_1$ is not marked as dirty following this write operation, thereby effectively indicating to the microprocessor system that a future write back operation will not be needed for this cache line. In other words, the CDC 20 will not respond to the next access of $CL_1$ with a determination that $CL_1$ is a dirty cache line. It can be appreciated that by writing the data to both the cache memory 30 and the write buffer 52 in DPU 50, the write through type operation of the present invention effectively consumes the same amount of processor time as would a write to a write back cache, but actually provides for the benefits one would find in a write through cache.

Referring briefly to FIG. 4, it can be observed that this figure illustrates two initial determinations of the existence of predesignated conditions, namely, whether the DPU write buffer is full and whether the associated cache line is dirty or clean. While these two determinations appear in this figure in serial fashion to simplify the illustration of the present invention, these determinations are not necessarily made in a serial fashion, time-wise. In particular, in an embodiment of the present invention, these determinations of the existence of predesignated conditions are made simultaneously within the CDC 20 such that: if first predesignated conditions are met, that is if the DPU write buffer 52 is full or the cache line is dirty, a write back mode of operation is utilized. Alternatively, if second predesignated conditions exist, that is if the DPU write buffer 52 is not full and the cache line is clean, a write through mode of operation using the DPU write buffer 52 is utilized. It will be appreciated by those skilled in the art that these functions can readily be implemented using a variety of architectural designs. The previously described determination by the CDC 20 as to whether the write buffer 52 is full can be made through the use of buffers in the CDC 20. In particular, the CDC 20 can include address buffers (not shown) which parallel or correspond to those in DPU 50 such that there is a one to one correspondence between the address buffers in the CDC 20 and the data buffers in the DPU 50. Thus, when the address buffers in CDC 20 are full, so too are the data buffers in DPU 50. Using this approach, all the information required to make the determination is within the CDC 20. Alternatively, the determination can be made through the use of a control signal (not shown) which the DPU 50 issues to the CDC 20 in the event that write buffer 52 is full.

From the foregoing description, it can be appreciated that the present invention provides for a novel, hybrid use of a cache memory. As previously described, a write back cache provides a certain advantage to a microprocessor system because the microprocessor does not have to immediately write to main memory every time it writes to cache memory. However, there is processor overhead associated with a write back cache because the system will likely, at some later time, for example in response to a bus master trying to access a cache line which is currently in the cache and modified, need to write back the modified line to memory. In accordance with the present invention, to the maximum extent possible, modified data is written to main memory in the background. More particularly, by using a dynamic mix of write back and write through strategies, depending upon buffer availability, the present invention retains the advantages of a write back cache, while also taking advantage of a write through strategy using a write buffer.

Figure 5:
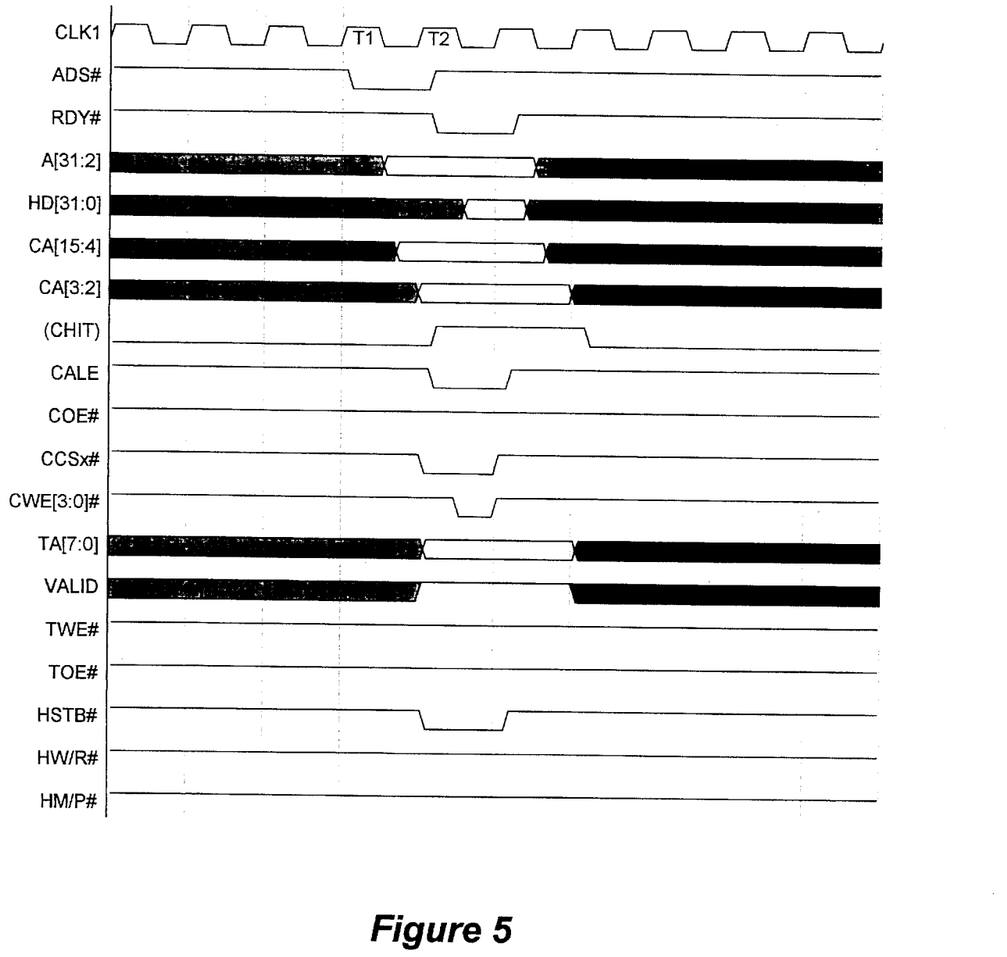
FIG. 5 is a timing diagram illustrating the control signals utilized in the write through mode of the present invention.
Figure 6:
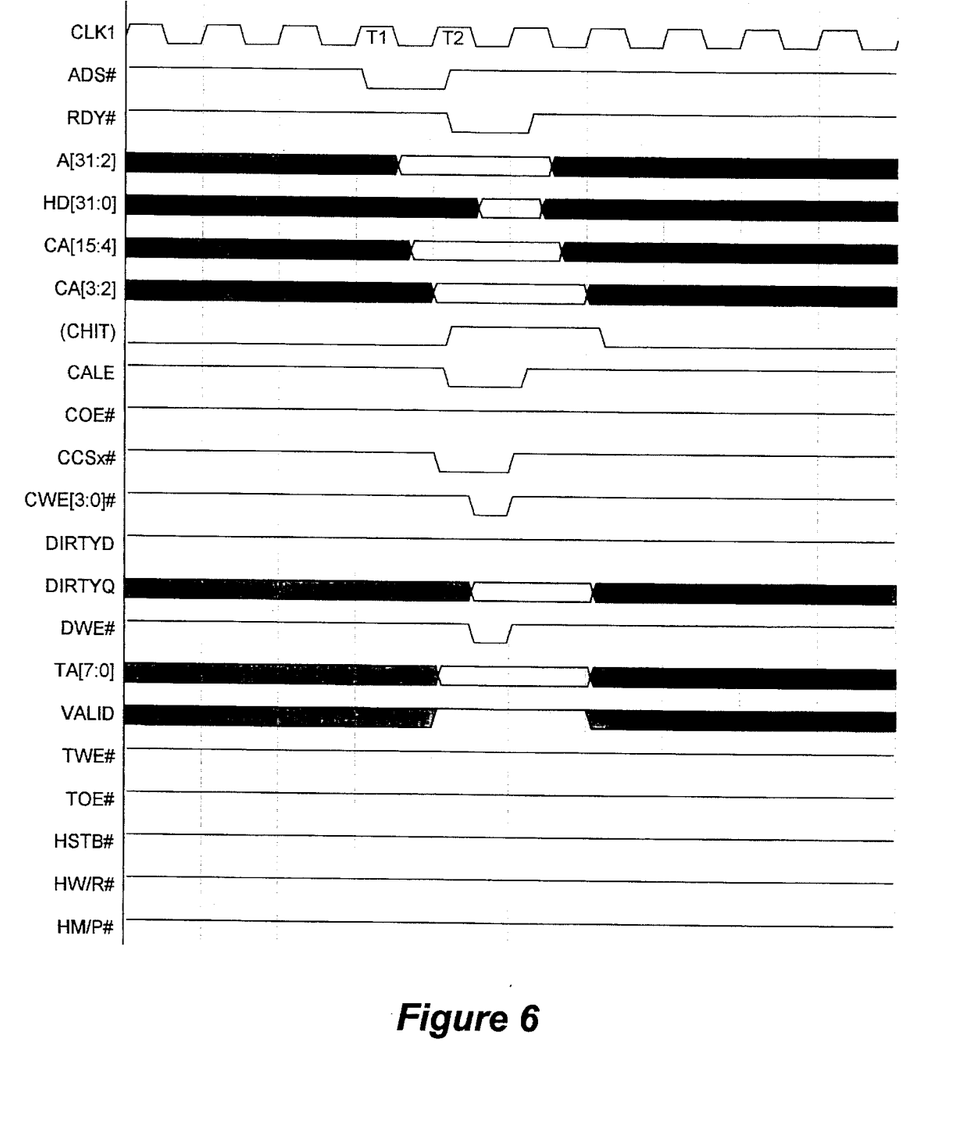
FIG. 6 is a timing diagram further illustrating the control signals utilized in the write back mode of the present invention.

Referring now to FIGS. 5 and 6, these figures illustrate, respectively, timing diagrams for the above described write through and write back modes of operation. With respect to the signals shown in these figures, the symbol "#" at the end of a particular signal name indicates that the active or asserted state occurs when the signals is at a low voltage level, while signals which do not have a "#" present after the signal name are asserted at a high voltage level. Referring now to FIG. 5 illustrating the write through mode, in view of the apparatus shown in FIG. 3, the CPU 10 initially couples an address status control signal (ADS#) to the CDC 20 over the CPU control bus 16. This control signal indicates that a valid bus cycle identification, byte enable signals and addresses are available to the CDC 20. The write address is then provided to the CDC 20 over the address lines (A[31:2]) of the address bus 12. The data is then driven over the data lines [HD (31:0)] of the CPU data bus 14. The CDC 20 causes the data to be captured by the DPU 50 through the use of the control signals (HW/R#) and (HSTB#) coupled to DPU which inputs 50, the data on the CPU data bus 14. With reference now to FIG. 6, this figure illustrates a timing diagram of the above described write back mode. It can be observed that in this mode of operation, the CDC 20 does not cause the data to be captured by the DPU 50 through the use of the control signals (HW/R#) and (HSTB#). It can also be observed that in this mode of operation, the cache line is marked as dirty through the (DWE #) signal.

With reference to both FIGS. 5 and 6, some of the other signals shown in these figures include: the cache address signals CA[15:4] and CA[3:2] which generate the burst sequences required by the CPU 10 during secondary cache accesses; the cache write enable (CWE[3:0]#) which provides byte wide write capability to the cache during cache line fills or cache write hits; (CCSx) the cache chips select signal; the cache output enable signal (COE#) which is used to perform read cycles from the cache; the tag write enable signal (TWE#) which is connected to a tag map write enable (WE#) pin (not shown) of the tag map 25, wherein the TWE# signal is active during CPU read-miss cycles when the cache is updated; and the tag output enable signal (TOE#) which controls an output enable pin of the tag map such that when active, tag address and valid bits are driven into the CDC, and wherein this signal is normally active, and driven inactive only during tag update. The RDY# signal represents the ready signal issued to the CPU when the cycle has completed. The (chit) signal is an internal signal to CDC indicating that a cache hit has occurred.

The VALID signal indicates the validity of data in the cache memory on a line by line basis. VALID is used along with the tag addresses to make the cache hit/miss decision by the CDC. If sampled low during a CPU memory read cycle, data is not valid in the cache. During an invalidate cycle, the VALID signal is forced low indicating data is not valid. The DIRTY D signal indicates whether the data in the cache is being marked as modified. The dirty bit write enable signal (DWE#) goes active when the CPU does a write back cycle to the cache memory 30. The tag address signals TA[7:0] are directly connected to the tag map. The DIRTYQ line indicates whether data in the cache was marked dirty. The CLK1 signal input provides the timing for the CDC. The RAS signal represents the row address strobe and CAS represents the column address strobe to the DRAM 40.

While the present invention has been particularly described with reference to FIGS. 1 through 6, it should be understood that these figures are for illustration only and should not be taken as limitations upon the invention. It is further contemplated that many changes and modifications may be made to the invention, by one of ordinary skill in the art, without departing from the spirit and scope of the invention as disclosed herein.

We claim:

1. A processor system comprising:

a processor;

a main memory;

a cache memory coupled to the processor, the cache memory including a plurality of cache lines associated with cached addresses of the main memory;

a data path unit coupled to the processor and the main memory, the data path unit further comprising at least one write buffer;

a controller coupled to the processor, the cache memory, the data path unit, and the main memory, wherein the controller selects between one of a write back mode of operation and a write through mode of operation when transferring data from the processor to the main memory in accordance with a first predesignated condition of the write buffer and a selected predesignated condition of a selected cache line.

2. The processor system of claim 1 wherein the controller selects a write back mode of operation to write data from the processor to the selected cache line in cache memory if the write buffer is full or the selected cache line contains modified data, wherein the writing of data from the selected cache line to the main memory is deferred.

3. The processor system of claim 1 wherein the controller selects a write through mode of operation to write data from the processor to both the selected cache line and to the write buffer if the write buffer is not full and the selected cache line does not contain modified data, wherein the writing of data from the write buffer to the main memory occurs during a subsequent processor cycle.

4. A method of maintaining coherency between a processor cache memory and a main memory, comprising the steps of:

a) initiating a write operation to transfer write data from a processor to a first address within the main memory, the processor coupled to at least one write buffer for transferring data between the processor and the main memory, the processor coupled to a controller for controller data transfer between the processor and the main memory and between the processor and the cache memory, wherein the first address is associated with a cache line within the cache memory;

b) determining whether the write buffer is in a first predesignated condition;

c) determining whether the cache line is in a second predesignated condition;

d) performing a write-back operation if either one of the first and the second predesignated conditions is met; and e) performing a write-through operation if neither of the first and the second predesignated conditions is met.

5. The method of claim 4 wherein the first predesignated condition is that the write buffer is full.

6. The method of claim 4 wherein the second predesignated condition is that the cache line contains modified data.

7. The method of claim 4 wherein step d) further comprises the steps of:

i) using the controller to write the write data from the processor to the cache line in the cache memory; and ii) deferring a write operation from the cache line to the first address within the main memory.

8. The method of claim 4 wherein step e) further comprises the steps of:

i) using the controller to write the write data from the processor to both the cache line in cache memory and to the write buffer; and ii) writing the write data from the write buffer to the first address within the main memory during a subsequent processor cycle.

9. The method of claim 4 wherein steps b) and c) are performed substantially concurrently.

10. A dynamic cache coherency method in a microprocessor system comprising a central processing unit (CPU), a cache memory coupled to said CPU having cache lines associated with addresses in said microprocessor system, main memory means, write buffer means coupled to said main memory means, and a cache and main memory controller for controlling the operation of said cache memory and controlling transfers of data from said CPU to said main memory means and said cache memory, as well as from said write buffer means to said main memory means, wherein said cache and main memory controller is coupled to said CPU, said main memory means, said cache memory, and said write buffer means, said dynamic cache coherency method comprising the steps of:

said CPU initiating a write access of said data to a first address in said microprocessor system;

when said write access is initiated, said cache and main memory controller determining whether said write buffer means is full and whether a particular cache line in said cache memory associated with said first address is dirty;

if said write buffer means is full, said cache and main memory controller causing said data to be transferred to said particular cache line in said cache memory;

if said write buffer means is not full and said particular cache line is dirty, said cache and main memory controller causing said data to be transferred to said particular cache ine in said cache memory;

if said write buffer means is not full and said particular cache line is clean, said cache and main memory controller causing said data to be transferred to said particular cache line in said cache memory and said write buffer means, and thereafter, said cache and main memory controller causing said data to be transferred from said write buffer means to said main memory means.

11. The dynamic cache coherency as provided in claim 10, wherein said main memory comprises a dynamic random access memory (DRAM).

12. The dynamic cathe coherency method as provided in claim 10, wherein, subsequent to said step of, if said write buffer is full, said cache and main meomry controller causing said data to be transferred to said particular cache line in said cache memory, said data is written back from said particular cache line in said cache memory to said main memory means when the data has not been updated in the main memory means.

13. The dynamic cache coherency method as provided in claim 12, wherein, subsequent to said step of, if said write buffer is not full and said particular cache line is dirty, said cache and main memory controller causing said data to be transferred to said particular cache line in said cache memory, said data is written back from said particular cache line in said cache memory to said main memory means when the data has not been updated in the main memory means.

* * * * *

UNITED STATES PATENT AND TRADEMARK OFFICE
CERTIFICATE OF CORRECTION

PATENT NO. : 5,561,783
DATED : October 1, 1996
INVENTOR(S) : Vanka et al.

It is certified that error appears in the above-identified patent and that said Letters Patent is hereby corrected as shown below:

In column 5 at line 38 delete "teaching" and insert --teachings--

In column 6 at line 42 delete "Will" and insert --will--

In column 7 at line 24 insert --address-- following "of" and prior to "buffers"

In column 10 at line 43 delete "cathe" and insert --cache--

In column 10 at line 45 delete "meomry" and insert --memory--

Signed and Sealed this

Fifteenth Day of July, 1997

*Attest:*

BRUCE LEHMAN

*Attesting Officer*     *Commissioner of Patents and Trademarks*